United States Patent
Weaver et al.

(10) Patent No.: US 6,628,957 B1
(45) Date of Patent: Sep. 30, 2003

(54) SYNCHRONIZATION OF TRANSMIT POWER LEVEL SETTINGS FOR SOFT-HANDOFF IN WIRELESS SYSTEMS BY THE USE OF LEVEL CONSTRAINTS

(75) Inventors: Carl Francis Weaver, Hanover Township, Morris County, NJ (US); Xiao Cheng Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/354,696

(22) Filed: Jul. 16, 1999

(51) Int. Cl.[7] .................................................. H04B 7/00
(52) U.S. Cl. ........................ 455/522; 455/442; 370/331
(58) Field of Search ................................. 455/442, 525, 455/524, 522, 436, 69, 418; 370/331

(56) References Cited

U.S. PATENT DOCUMENTS

| | | | | |
|---|---|---|---|---|
| 4,811,421 A | * | 3/1989 | Havel et al. | 455/69 |
| 4,993,021 A | * | 2/1991 | Nannicini et al. | 370/77 |
| 5,056,109 A | * | 10/1991 | Gilhousen et al. | 375/1 |
| 5,574,984 A | * | 11/1996 | Reed et al. | 455/69 |
| 5,703,902 A | * | 12/1997 | Ziv et al. | |
| 5,745,520 A | * | 4/1998 | Love et al. | |
| 6,035,209 A | * | 3/2000 | Tiedemann, Jr. et al. | |
| 6,070,085 A | * | 5/2000 | Bender et al. | |
| 6,075,974 A | * | 6/2000 | Saints et al. | 455/69 |
| 6,301,232 B1 | * | 10/2001 | Dutta | |

* cited by examiner

Primary Examiner—Nguyen T. Vo
Assistant Examiner—Nghi H. Ly (57) ABSTRACT

Base station in a soft handoff programmed to have a threshold power level to control the power transmitted by the base station on the forward link. When the threshold power level is a minimum-threshold power level, each base station maintains its transmit power level at or above the minimum-threshold power level. When the threshold power level is a maximum-threshold power level, each base station maintains its transmit power level at or below the maximum-threshold power level. Preferably, all power levels are expressed in decibels (dB) relative to the pilot's power level. The threshold power level can be adjustable or fixed. In the case where the threshold power level is fixed, each base station is programmed with the fixed threshold power level, and each base station decides how to adjust its transmit power level locally based on the fixed threshold power level without input from other base stations. In the case where the threshold power level is adjustable, the threshold power level is adjusted by a threshold step size responsive to the transmit power level being substantially equal to the threshold power level for at least a predetermined percentage of a time period. There are two alternatives on how each base station decides how to adjust its transmit power level. In one alternative, each base station participating in a soft handoff sends its power control information to a processor which adjusts the threshold power level and notifies each base station of the new adjusted threshold power level. In the meantime, each base station uses its current threshold power level to locally adjust its transmit power level. In the other alternative, each base station adjusts the threshold power level locally without input from other base stations, and uses the threshold power level to adjust its transmit power level.

16 Claims, 10 Drawing Sheets

SYNCHRONIZATION OF TRANSMIT POWER LEVEL SETTINGS FOR SOFT-HANDOFF IN WIRELESS SYSTEMS BY THE USE OF LEVEL CONSTRAINTS

BACKGROUND OF THE INVENTION

1. Field of the Invention

The present invention relates generally to wireless communication systems and, in particular, to forward link power control during soft handoff in wireless communication systems.

2. Description of the Related Art

Wireless communication systems employ Code Division Multiple Access ("CDMA") modulation techniques to permit a large number of system users to communicate with one another. Such systems work because each signal is coded with spreading sequences, such as with a pseudo-random noise ("PN") sequence, and orthogonal spreading sequences, such as Walsh codes. This coding permits signal separation and signal reconstruction at the receiver. In typical CDMA systems, communication is achieved by using a different spreading sequence for each channel. This results in a plurality of transmitted signals sharing the same bandwidth. Particular transmitted signals are retrieved from the communication channel by despreading a signal from all of the signals. Despreading is achieved by using a known user despreading sequence related to the spreading sequence implemented at the transmitter.

Figure 1:
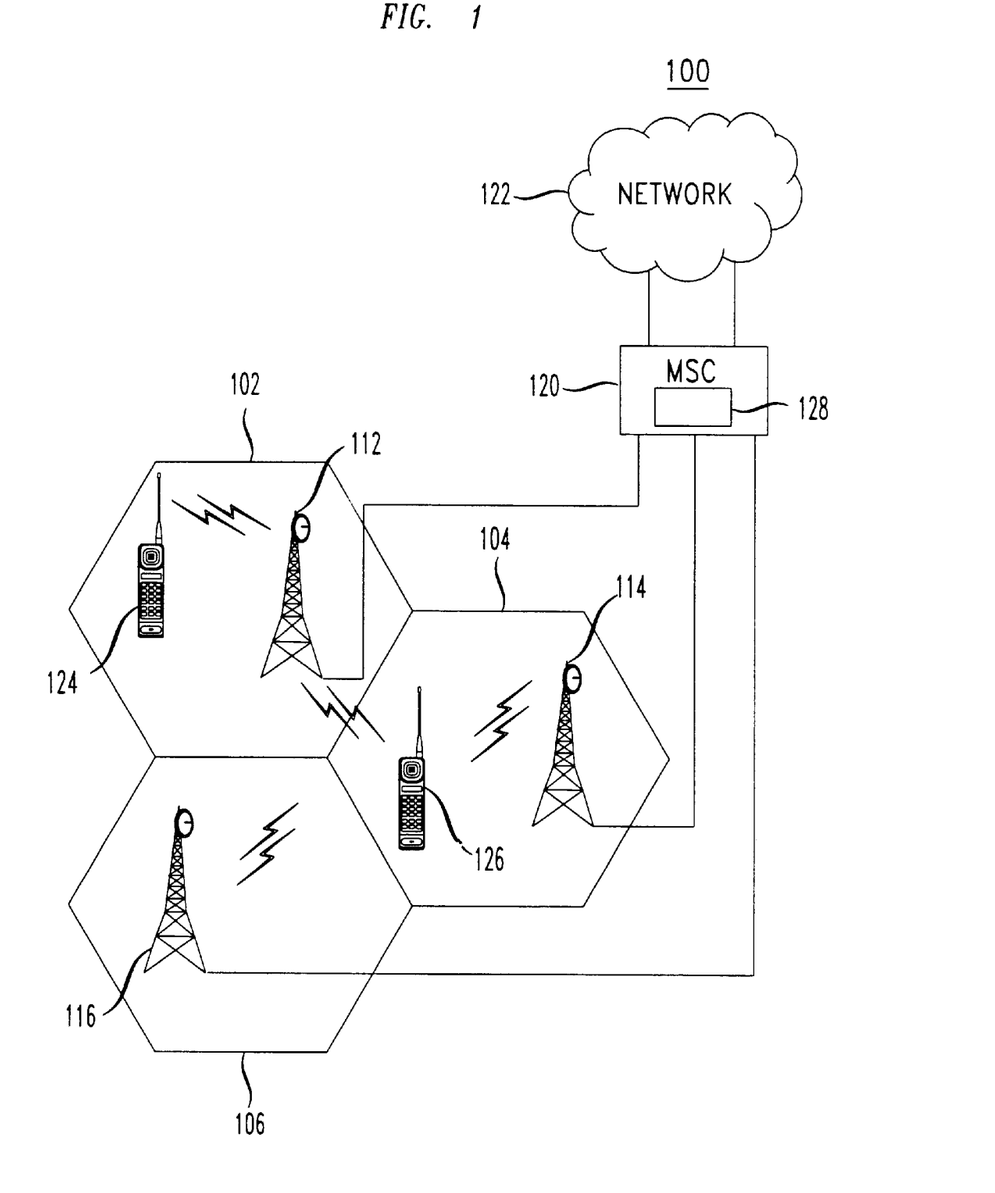
FIG. 1 is a block diagram of a portion of a wireless communication system.

FIG. 1 illustrates CDMA system 100. The geographic area serviced by CDMA system 100 is divided into a plurality of spatially distinct areas called "cells." Although cells 102, 104, 106 are illustrated as a hexagon in a honeycomb pattern, each cell is actually of an irregular shape that depends on the topography of the terrain surrounding the cell. Each cell 102, 104, 106 contains one base station 112, 114, and 116, respectively. Each base station 112, 114, and 116 includes equipment to communicate with Mobile Switching Center ("MSC") 120, which is connected to local and/or long-distance transmission network 122, such as a public switch telephone network (PSTN). Each base station 112, 114, and 116 also includes radios and antennas that the base station uses to communicate with mobile terminals 124, 126.

When a call is set up in CDMA system 100, mobile terminal 124 communicates with the base station from which mobile terminal 124 receives the strongest pilot signal, in this case base station 112. Base station 112 and mobile terminal 124 communicate over a forward link and a reverse link. The forward link includes communication channels for transmitting signals from the base station to the mobile terminal, and the reverse link includes communication channels for transmitting signals from the mobile terminal to the base station. Base station 112 transmits control information to mobile terminal 124 over a communication channel, referred to herein as a forward control channel, and it transmits voice or data over a communication channel, referred to herein as a forward traffic channel. Mobile terminal 124 transmits control information to base station 112 over a communication channel, referred to herein as a reverse control channel, and it transmits voice or data over a communication channel, referred to herein as a reverse traffic channel. The communication channels are organized in 20-millisecond (ms) time periods, referred to herein as frames. Forward traffic frames are frames transmitted over the forward traffic channel, and reverse traffic frames are frames transmitted over the reverse traffic channel.

The number of signals that can be transmitted simultaneously is limited by each of the transmitted signals' fraction of the total power, referred to herein as the power fraction. Thus, reducing the power fraction of each of the signals increases the capacity of the wireless communication system. However, reducing the power fraction of a signal increases the number of errors in that signal. A goal of power control is to adjust the power level of the signals in such a way as to keep the power fractions as close as possible to a level that allows the system to maximize capacity while keeping the number of errors in the signal at an acceptable level. Forward link power control varies the power output of the base station to maintain a constant frame error rate at the mobile terminal. A frame error occurs when one or more uncorrectable bit errors occur in a frame. The frame error rate is the number of frame errors divided by the total number of frames observed. A targeted frame error rate, typically between 1% and 3%, depending on the desired system performance, is selected to minimize power without compromising signal quality. If the frame error rate exceeds the targeted frame error rate, the usefulness of the signal is reduced and the power level is increased to decrease the number of frame errors. If the frame error rate is below the targeted frame error rate, the power level exceeds the optimum power level, and the power level is reduced.

When the mobile terminal is in a soft handoff, all the base stations involved in the soft handoff are involved in the forward link power control. When mobile terminal 126 receives fairly strong pilot signals from more than one base station, in this case from three base stations 112, 114, and 116, the mobile terminal is in soft handoff. This typically occurs when mobile terminal 126 is close to the edge of a cell. All three base stations 112, 114, and 116 transmit control information to mobile terminal 126 over respective forward control channels, and voice or data over respective forward traffic channels. In soft handoff, mobile terminal 126 transmits control information to all three base stations 112, 114, and 116 over respective reverse control channels, and it transmits voice or data to all three base stations 112, 114, and 116 over respective reverse traffic channels.

Base stations 112, 114, and 116 transmit forward traffic frames. Each forward traffic frame includes voice or data and error control information, typically in the form of a cyclical redundancy code (CRC). By contrast, each reverse traffic frame includes voice or data and error indicator bits (EIB) for indicating whether the last received forward traffic frame contained an error. Mobile terminal 126 receives the transmissions from all three base stations 112, 114, and 116 and combines the signals from all three to obtain the forward traffic frame. Mobile terminal 126 then checks the CRC of the combined signal to determine whether the forward traffic frame is in error. Mobile terminal 126 indicates this determination to all three base stations 112, 114, and 116 using the EIB in the next reverse traffic frame that mobile terminal 126 transmits. For example, a zero error indicator bit indicates that the forward traffic frame is not in error, and a positive error indicator bit indicates the forward traffic frame is in error. Upon receiving reverse traffic frames from the mobile terminal, the base stations sends the EIB to selection distribution unit (SDU) 128. SDU 128 examines all three EIBs, and determines whether the majority of the EIBs indicate an erred forward traffic frame. SDU 128 then indicates to all three base stations whether, and how, they should adjust the power of their forward links. For example, mobile terminal 126 can send an EIB indicating an erred forward traffic frame. Base station 112 and 116 can receive EIB that indicating that there is an error in the frame.

However, due to interference on the reverse traffic link between mobile terminal 126 and base station 114, base station 114 receives an EIB indicating that the frame is not erred. After receiving and examining all three EIBs, SDU 128 would determine that there is an erred frame and indicate to all three base stations to increase the power of their forward link. Typically, it takes about five frames for the base station to transmit the EIBs to the SDU, and for the SDU to perform the determination and notify the base stations.

Therefore, in a conventional CDMA wireless communications system during soft handoff, there is a five frame, i.e., 100 ms, delay between the reception of the current power control information and the power control decision based on the information. In CDMA 2000 wireless communications systems the speed of power control is 800 Hz. Each frame includes sixteen 1.25 ms time intervals, referred to herein as power control groups. Power control information, referred to herein as a power-control bit, is sent every 1.25 ms, or once every power control group. Therefore, during the 100 ms delay in the power control decision, each base station receives new power control information 80 times. By the time the SDU indicates to the base stations how to adjust the power on the forward link, the information on which the SDU based this decision has been updated so many times that it just as likely to be incorrect as to be correct. Making the decision on 100 ms-old information loses much of the benefit of providing power control information every 1.25 ms.

Eliminating the step of sending the power control information to the SDU and then back to the base stations by performing the power control decisions at the base station allows the power control information to be used before it is outdated. However, it presents another serious problem. As described above, the three base stations can receive different power control information due to interference and fading on the reverse link. Therefore, the power level of some base stations will go up and the power level of other base stations will go down, causing a divergence between the power levels on the forward link of these base stations. The mobile terminal receives the strongest signal form one of the base stations, referred to herein as the primary base station, and weaker signals from other base stations, referred to herein as the secondary base stations. To ensure that the primary base station sends the signal at a large enough power for the signal to be received without too many errors, the secondary base stations may produce too much power. When the secondary base stations produce too much power, their capacity is reduced, which reduces the capacity of CDMA system 100. This problem is further exacerbated when the base station with the strongest forward link is not the base station with the strongest reverse link.

Figure 2:
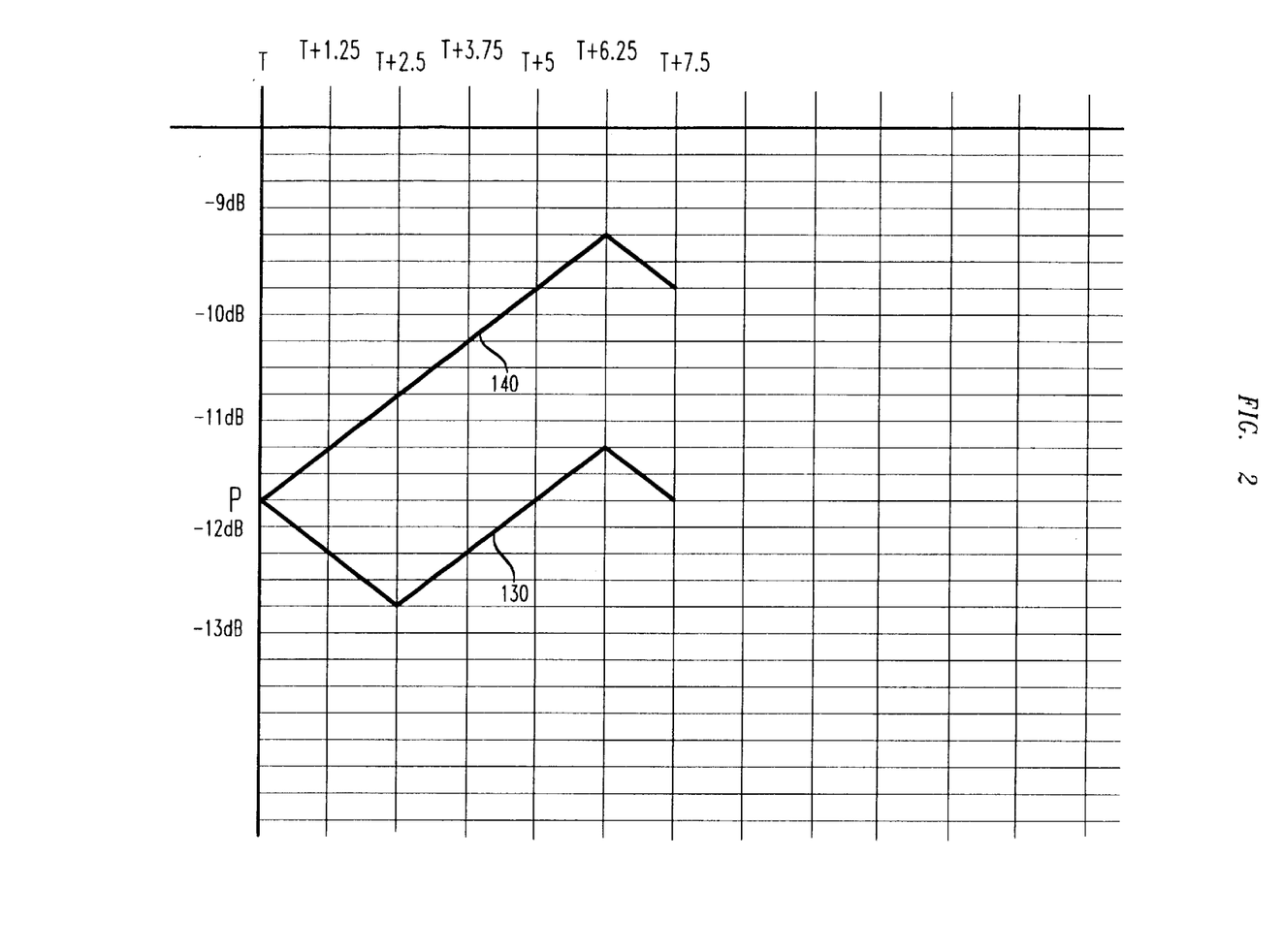
FIG. 2 is a graph illustrating the power level of a forward link traffic channel for the base stations in FIG. 1 over time.

FIGS. 1 and 2 illustrate this problem in more detail. FIG. 2 illustrates the power level of the traffic channel over time. At time T all three base stations 112, 114, and 116 are at a particular power level, P. Mobile terminal 126 transmits a power control bit to raise the power of the forward link. Base stations 112 and 116 receive a power control bit requesting the base station to increase their power, therefore they increase the power level of the forward link by a step size. However, due to interference on the reverse traffic link between mobile terminal 126 and base station 114, base station 114 receives a power control bit requesting it to decrease the power, therefore it decreases the power level of the forward link by a step size. Because base station 114 had the strongest forward link and it just reduced the power level of the forward link, mobile terminal 126 is still not getting the signal at a desired power. Mobile terminal 126 sends another power control bit requesting that the base stations increase the power on the forward link. If the reverse traffic link does not improve, base station 114 can again receive an incorrect power control bit while the other base stations receive the correct power control bit. This lowers the power level of the forward link from base station 114, and raises the power level of the forward links from base stations 112 and 116. Mobile terminal 126 again sends a power control bit requesting that the power on the forward link be increased.

When, at T+2.5, base station 114 finally receives the correct power control bit, it increases the power level 130 on its forward link. This is repeated until T+5, when mobile terminal 126 finally receives the signal at an acceptable power level. Base stations 112 and 116 also receive the power control bits to increase the power level, and also increase the power level 140 and 150 on their forward links. These two base stations 112 and 116 are now producing a great deal more power than necessary, which reduces the capacity of these two base stations and, therefore, reduces the capacity of CDMA system 100.

Accordingly, there exists a need for controlling power quickly while reducing the divergences between the power levels of the several base station in a soft handoff.

SUMMARY OF THE INVENTION

The invention solves the above problems by programming each base station in a soft handoff with a threshold power level to control the power transmitted by the base station on the forward link. When the threshold power level is a minimum-threshold power level, each base station maintains its transmit power level at or above the minimum-threshold power level. When the threshold power level is a maximum-threshold power level, each base station maintains its transmit power level at or below the maximum-threshold power level. Preferably, all power levels are expressed in decibels (dB) relative to the pilot's power level.

The threshold power level can be an adjustable threshold power level or a fixed threshold power level. In the case where the threshold power level is fixed, each base station is programmed with the fixed threshold power level, and each base station decides how to adjust its transmit power level locally based on the fixed threshold power level without input from other base stations.

In the case where the threshold power level is adjustable, the threshold power level is adjusted by a threshold step size when the transmit power level is substantially equal to the threshold power level for at least a predetermined percentage of a time period. For example, the threshold power level is adjusted by a threshold step size when the transmit power level is substantially equal to the threshold power level for at least 50% of the power control groups of a frame. There are two alternatives on how each base station decides how to adjust its transmit power level. In one alternative, each base station participating in a soft handoff sends its power control information to a processor which adjusts the threshold power level and notifies each base station of the new adjusted threshold power level. In the meantime, each base station uses the threshold power level it currently has to locally adjust its transmit power level. In the other alternative, each base station adjusts the threshold power level locally without input from other base stations, and uses the threshold power level to adjust its transmit power level.

DETAILED DESCRIPTION

Figure 3:
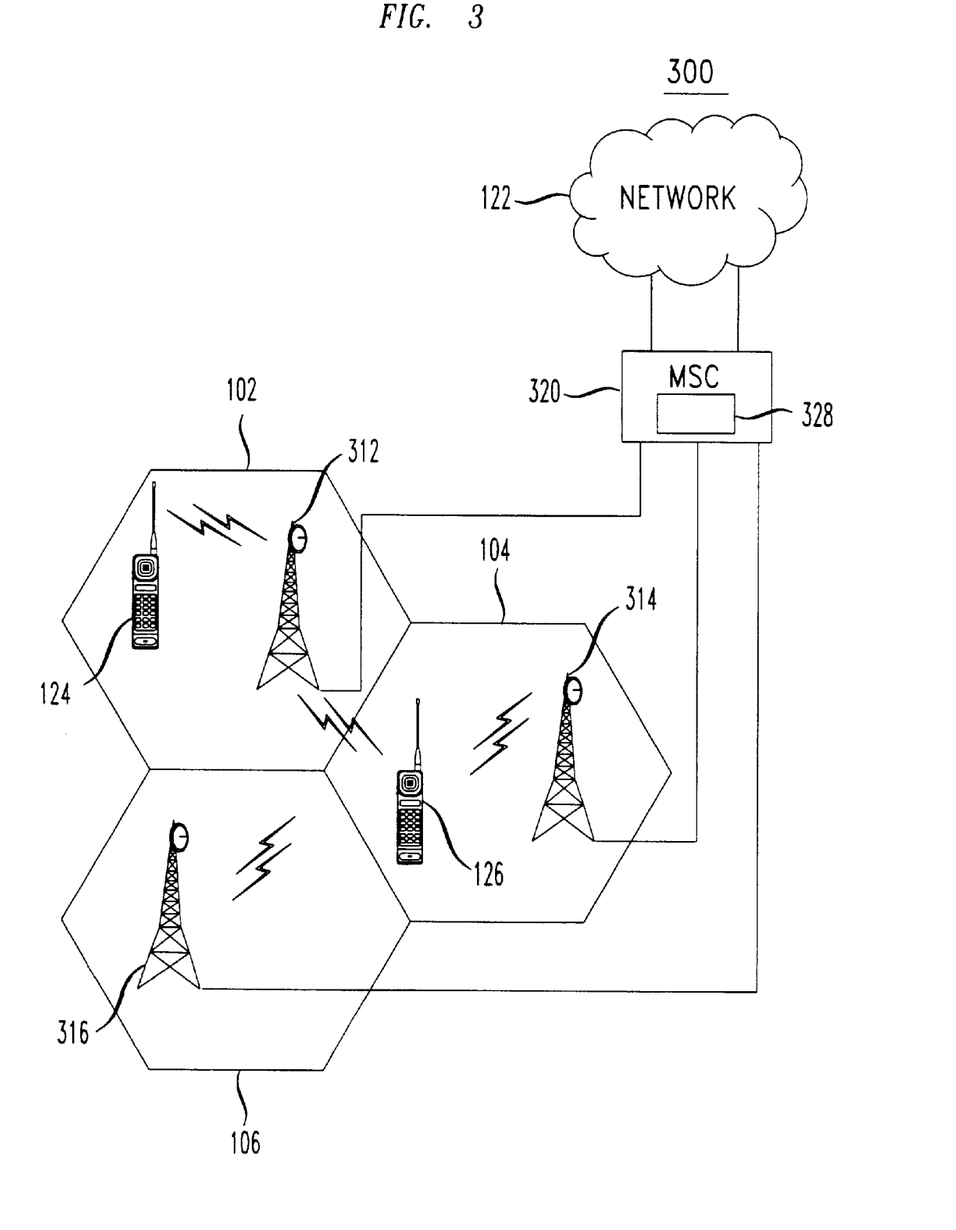
FIG. 3 is a block diagram of a portion of a wireless communication system having a processor in which the base stations have a threshold power level.

FIG. 3 illustrates CDMA system 300. Although the embodiment of the invention is being illustrated with the use of a CDMA system, the invention is not limited to use in CDMA systems. The invention may be equally applicable to any wireless communication system capable of soft handoff.

The geographic area serviced by CDMA system 300 is divided into cells 102, 104, and 106, each containing one base station 312, 314, and 316, respectively. Each base station 312, 314, and 316 includes equipment to communicate with Mobile Switching Center ("MSC") 320, which is connected to local and/or long-distance transmission network 122, such as a public switch telephone network (PSTN). Each base station 312, 314, and 316 also includes radios and antennas that the base station uses to communicate with mobile terminals 124, 126.

Each base station is programmed with a threshold power level to control the power transmitted by the base station on the forward link. Preferably, all power levels are expressed in decibels (dB) relative to the pilot's power level. The threshold power level can be adjustable or fixed.

In the case where the threshold power level is fixed, each base station is programmed with the fixed threshold power level and each base station decides how to adjust its transmit power level locally based on the fixed threshold power level without input from other base stations. Each base station in a soft handoff should use the same value for the fixed threshold power level when communicating with the mobile station in the soft handoff. This fixed threshold power level can be determined by the primary base station and provided to the secondary base stations at the start of the soft handoff, or the fixed threshold power level can be determined at a central location, such as MSC 320, and provided to all of the base stations in the soft handoff. The base stations in another soft handoff can use either this same value or another value for the fixed threshold power level when communicating with the mobile station in the other soft handoff.

In the case where the threshold power level is adjustable, there are two alternatives on how each base station decides how to adjust its transmit power level. In one alternative, each base station participating in a soft handoff sends its power control information to processor 328, such as the selection distribution unit. Processor 328 adjusts the threshold power level and notifies each base station of the new adjusted threshold power level. In the meantime, each base station uses its current threshold power level to locally adjust its transmit power level. In the other alternative, each base station adjusts the threshold power level locally without input from other base stations, and uses the threshold power level to adjust its transmit power level. The fixed threshold power level and the threshold power level adjustable by a processor are preferable to the threshold power level adjustable locally by each base station.

Additionally, in each of the above-described cases, the threshold power level can be either a minimum or a maximum-threshold power level. Alternatively, each base station can have both a minimum-threshold power level and a maximum-threshold power level.

Figure 4:
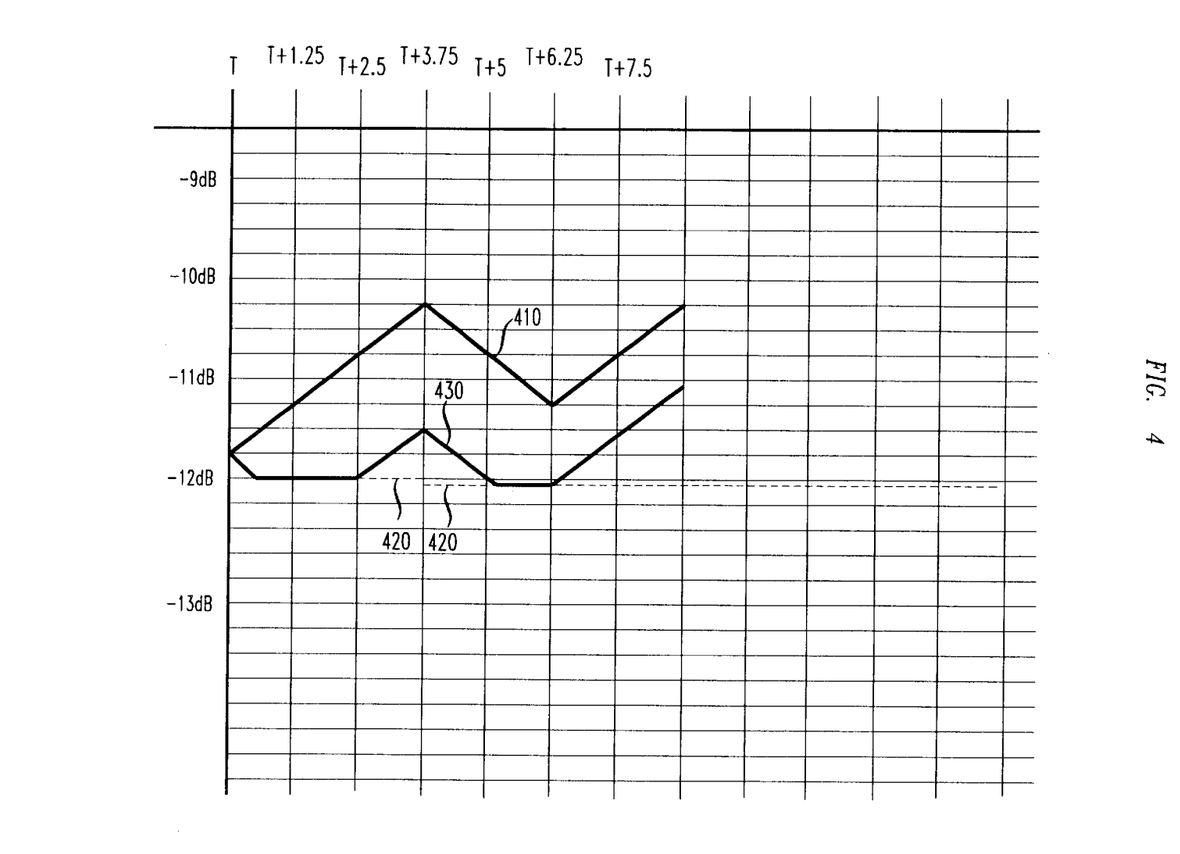
FIG. 4 is a graph illustrating the power level of a forward link traffic channel of the base stations in FIG. 3 over time.

FIGS. 3, 4, 5A and 5B illustrate the case where the threshold power level is a minimum-threshold power level that is adjusted by processor 328. Mobile terminal 126 transmits a power control bit (PCB) requesting an adjustment of the transmit power level of forward link. For example, mobile terminal 126 transmits a power control bit requesting that the base stations increase the transmit power level. In step 500, the base stations receive the power control bit. Base station 312 and 316 receive a power control bit requesting that the base stations increase their transmit power level. However, due to fading and/or interference on the reverse traffic link between mobile terminal 126 and base station 314, base station 314 receives a power control bit requesting it to decrease its transmit power level. In step 510, each of the base stations 312, 314, and 316 check if the received power control bit instructed it to adjust its transmit power level toward the minimum-threshold power level. In this case, each base station checks if the power control bit instructed the base station to adjust its transmit power level down. For base stations 312 and 316, the answer in step 510 is no. As shown in FIG. 4, at time T, these two base stations proceed to step 520, where they adjust their transmit power level 410 up by one step size, as indicated by the power control bit. Then, in step 552, base stations 312 and 316 indicate their transmit power level to processor 328. Processor 328 adjusts the minimum-threshold power level once every frame as described below. Therefore, unless the processor determines that value of the minimum-threshold power level should remain the same, each base station receives the adjusted minimum-threshold power level from processor 328 once per frame. Typically, the base station receives the adjusted minimum-threshold power level from processor 328 at the same time within each frame. In step 555, each base station checks if it is the time at which it receives the adjusted minimum power level from the processor. If the answer is no, then the base station returns to step 500 and awaits the next power control bit. If the answer in step 555 is yes, then, in step 560, each base station receives the adjusted minimum-threshold power level 420 from processor 328 and changes its minimum-threshold power level to the adjusted threshold power level. The base station then returns to step 500 and awaits the next power control bit.

Figure 5A:
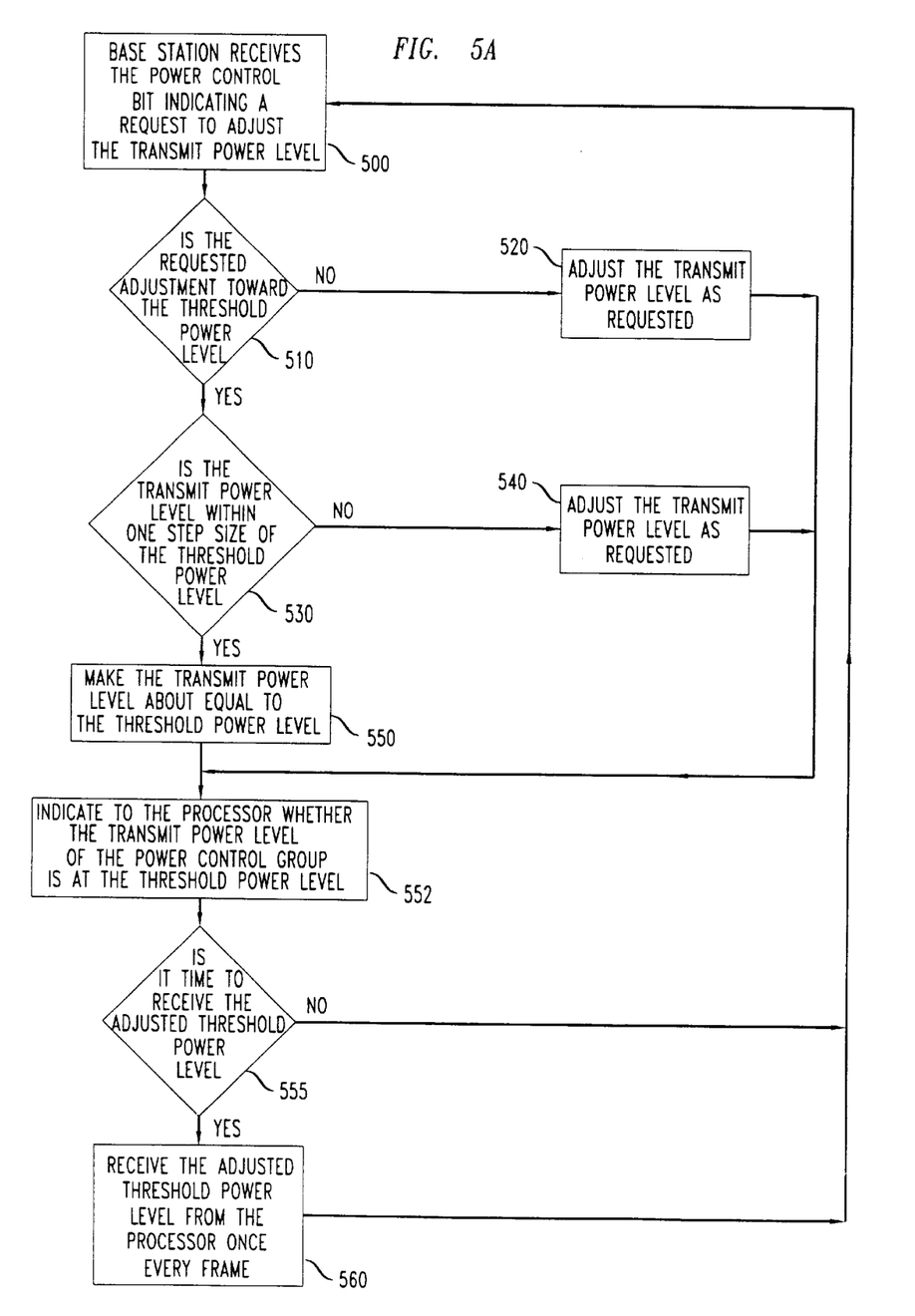
FIGS. 5A and 5B are flowcharts illustrating the method of controlling the transmit power level of a base station when the base station has a threshold power level.

For base station 314, the answer in step 510 is yes, and it proceeds to step 530, where base station 314 checks if its transmit power level 430 is within one step size from the minimum-threshold power level 420. If the answer in step 530 is no, in step 540, the base station would adjust its transmit power level down by one step size, indicate its transmit power level to processor 328 in step 552, check whether it is time to receive the adjusted minimum power level from the processor, and return to step 500. If the answer in step 530 is yes, as it is in this case, base station 314 proceeds to step 550 and adjusts its transmit power level 430 to be equal to the minimum-threshold power level 420. In step 552, base station 314 indicates its transmit power level 430 to processor 328, and in step 555, the base station checks if it is time to receive the adjusted minimum power level from the processor. If the answer is no, then the base station returns to step 500 and awaits the next power control bits. If the answer in step 555 is yes, then, in step 560, the base station receives the adjusted minimum-threshold power level 420 from processor 328 and changes its minimum-threshold power level to the adjusted threshold power level. The base station then returns to step 500 and awaits the next power control bit.

Because base station 314 had the strongest forward link and reduced the transmit power level 430 of the forward link, mobile terminal 126 is still not getting the signal at a desired power. Mobile terminal 126 sends another power control bit requesting that the base stations increase the power on the forward link. At step 500, base stations 312 and 316 receive a power control bit requesting the base station to increase their power, and following the steps described above, at time T+1.25, base stations 312 and 316 again increase the transmit power level of their forward link 410 by a step size. If the reverse traffic link has not improved, base station 314 can again receive a power control bit requesting it to decrease the power (i.e., base station 314 again receives the incorrect power control bit). Base station 314 follows the same steps described above. As can be seen in FIG. 4, when base station 314 reaches step 550 at time T+1.25, its transmit power level 430 is already at the minimum-threshold power level 420. Therefore, base station's 314 transmit power level 430 remains at the minimum-threshold power level 420.

Mobile terminal 126 again sends a power control bit requesting that the power on the forward link be increased. When base station 314 finally receives the correct power control bit, it increases the transmit power level 430 on its forward link, and mobile terminal 126 finally receives the signal at an acceptable power level. Base stations 312 and 316 also received the power control bit, and also increase the transmit power level 410 on their forward links.

As can be seen by comparing FIGS. 2 and 4, during soft handoff, the difference between the transmit power levels 410 and 430 of the base stations having the minimum-threshold power level is significantly smaller than the difference between the transmit power levels 140 and 130 of the base stations not having it. This prevents some of the base stations from transmitting at an excessive power level and, therefore, reduces the total power of the system.

Figure 5B:
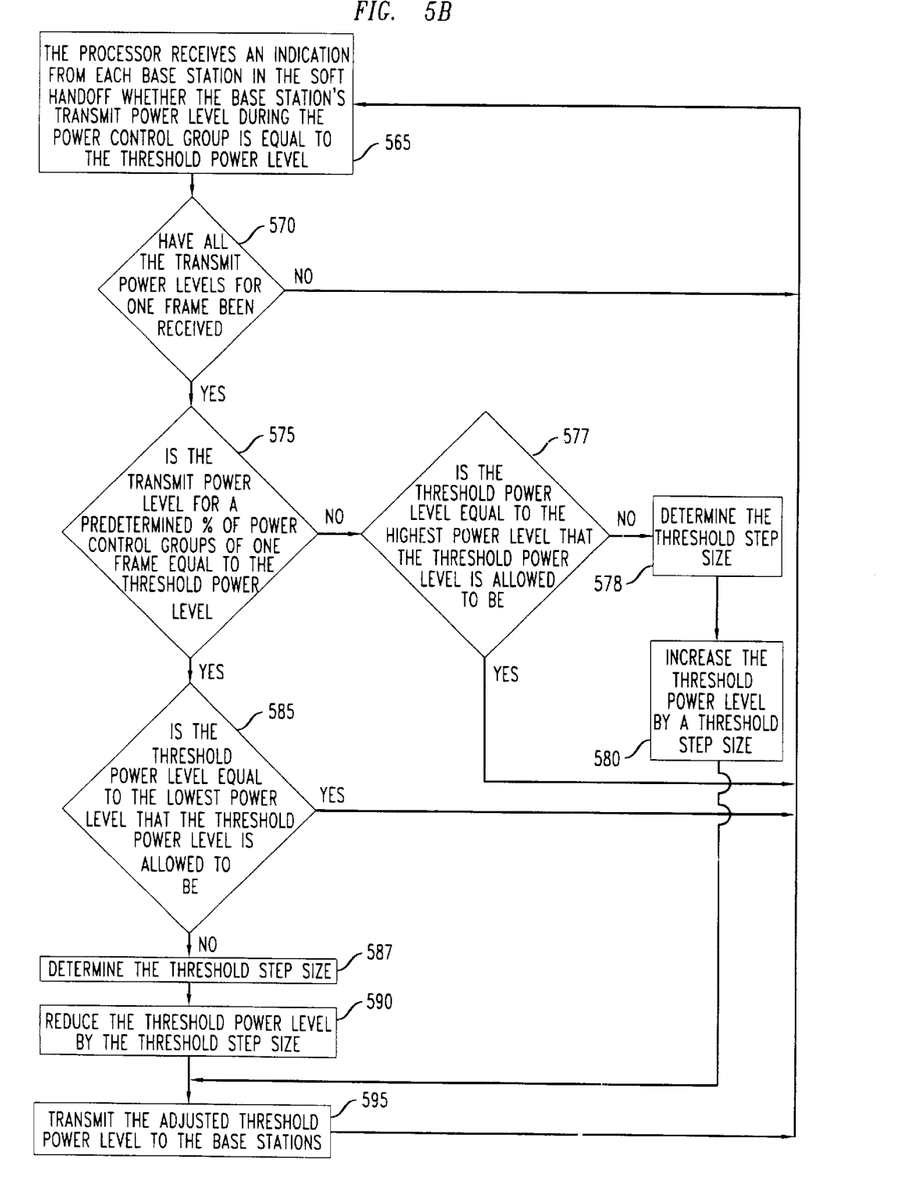

As mentioned above in step 552, base stations 312, 314, and 316 indicate their transmit power levels to processor 328. As shown in FIGS. 3, 4, and 5B, in step 565, once every power control group, processor 328 receives an indication from each of the base stations 312, 314, and 316 in the soft handoff whether the base station's transmit power level is equal to the minimum-threshold power level. Alternatively, each base station can keep a counter of the number of times it is at the minimum-threshold power level during a frame, and it can transmit the count to processor 328 once per frame. In step 570, processor 328 checks if it received all the indications from each of the base stations for the time period, which is preferably one frame. For example, since each base station sends one indication to processor 328 every power control group, with 16 power control groups per frame, processor 328 receives 48 indications per frame. If it has not received all indications, processor 328 returns to step 565 and awaits the next set of indications.

If it has received all the indications, then, in step 575, processor 328 checks whether during the frame all of the base stations had a transmit power level equal to the minimum-threshold power level for a predetermined percentage of the power control groups. For example, the predetermined percentage can be 50%, which is 24 power control groups for the 48 indications. Therefore, in step 575, processor 328 checks if for at least 24 power control groups of this frame the transmit power levels were equal to the minimum-threshold power level. If the transmit power level was equal to the minimum-threshold power level for 24 or more power control groups, then the processor would reduce the minimum-threshold power level, subject to any minimums on the minimum-threshold power. If the transmit power level was equal to the minimum-threshold power level for fewer than 24 power control groups, then processor 328 would raise the minimum-threshold power level, subject to any maximums on the minimum-threshold power.

The predetermined percentage should be selected to be the percentage that reduces the total transmitted power by the largest amount. The predetermined percentage can be obtained by performing a plurality of simulations or an empirical study to obtain the total power of the forward links to a mobile terminal in a soft handoff from all the base stations in the soft handoff. The base stations in the simulation are programmed with a minimum-threshold power level. Each simulation should be set up with the base stations at full load, i.e., at full capacity, with a certain speed at which the mobile terminal is moving, with a certain signal-to-noise ratio between the base stations and the mobile terminal. The signal-to-noise ratio can be expressed as $$\frac{\hat{I}_{or}}{I_{oc} + N_o},$$

where $\hat{I}_{or}$ is the power level per unit of bandwidth at the mobile station, i.e. the sum of the power levels of all the signals from the base stations in the soft handoff with the mobile terminal, measured at the mobile terminal. $I_{oc}$ is the sum of the power levels of all the signals from the base stations in wireless communication system that are not in soft handoff with the mobile terminal, measured at the mobile terminal. $N_o$ is the thermal noise of the receiver of the mobile terminal.

In each simulation a particular percentage is set equal to the percentage of power control groups at which the processor adjusts the minimum-threshold power level. The simulation should obtain the total transmitted power for a significant enough length of time to ensure that the frame error rate on the forward link is acceptable. For example, when the desired frame error rate is 1% and significant enough length of time is about 10,000 frames. This total power is then averaged over the length of time, thus obtaining the average transmit power of the simulation.

The simulations should be repeated keeping all but one of the above factors the same, and varying one of the factors. The signal-to-noise ratio should be varied. For example, several simulations, such as 3, can be performed, each having a different signal-to-noise ratio, such as 2 dB, 5 dB, and 8 dB. The rest of the factors are kept constant, so all the base stations are at full capacity, the mobile terminal is moving at a certain constant speed, and the percentage is set to a constant percentage. Then, the speed at which the mobile terminal is moving is changed and the 3 simulation with different signal-to-noise ratios are repeated. The speed can be changed once or twice producing a total of 6 or 9 simulations. When two sets simulations are run using two speeds, the speeds 3 km/hr and 100 km/hr can used. When three sets of simulations are run 33 km/hr can be added as the third speed. The number of base stations in the soft handoff can also be changed, typically the simulations are run with either two or three base stations. The simulations with different signal-to-noise ratios and different speeds of the mobile should be repeated for the number of base stations being two and the number of base stations being three. The percentage of power control groups at which the processor adjusts the minimum-threshold power level is kept constant through these simulations. The average transmit power obtained in each simulation is averaged over all the simulation for the percentage. This averaged power is the power associated with the percentage.

The percentage is then changed and the same simulations are performed for another percentage. The simulations can be performed for another 2, 3 or many percentages depending on the amount of processor time available to run the simulations. The power associated with the percentages are then compared to each other and the lowest power is determined. The percentage associated with the lowest power is the optimum percentage and it should be selected as predetermined percentage of power control groups at which the processor adjusts the minimum-threshold power level. Typically, this percentage can be between 10% and 70% of the power control groups, such as 50%, although this percentage can be any percentage between 0% and 100%.

In addition to measuring the total transmitted power each simulation also measures the value of the minimum-threshold power level throughout the simulation. This value is averaged over the number of frames in the simulations, and then averaged over the number of simulations to obtain an averaged minimum-threshold power level that is associated with each percentage. The averaged minimum-threshold power level associated with the optimum percentage should be the initial value of the minimum-threshold power level in base stations 312, 314, and 316. Typically, this value will be between about 8 dB and 10 dB below the power level of the pilot.

Returning to step 575, when the answer in step 575 is no, processor 328 proceeds to step 577, where it checks if the minimum-threshold power level is equal to the highest power level that the minimum-threshold power level is allowed to equal. This highest power level is the power level needed for a signal when the base station is at full load and the path loss between the base station and the mobile terminal is at its highest. The highest power level can be obtained either from simulation or an empirical study. Typically, the highest power level can be between 0 dB and 11 dB below the pilot's power level. For example, in a CDMA 2000 1X system having a data rate of 9600, the highest power level can be 0 dB below the pilot's power level.

If the answer in step 577 is no, in step 578, processor 328 determines the threshold step size. Preferably, the threshold step size varies in size based the number of times the transmit power levels from all of the base stations are equal to the minimum-threshold power level. This allows the threshold step size to be more responsive to the transmit power level. Alternatively, the threshold step size can be a fixed step size.

Equation 1 illustrates one method of obtaining a threshold step size that varies in size based on the number of times the transmit power levels from all of the base stations are equal to the minimum-threshold power level. $E_u$ is the number of times that the relevant base stations' transmit power levels are not equal to the minimum-threshold power level. N is the number of power control groups in the frame. $A_N$ is the number of base stations in the soft handoff. $F_d$ is the predefined fraction of power control groups having transmit power levels equal to the minimum-threshold power level that trigger an adjustment in the minimum power level. $\Delta_d$ is the largest possible threshold step size per frame, expressed in dB.

$$\text{threshold step size} = \frac{E_u - N * A_N * (1 - F_d)}{1 - F_d} * \frac{\Delta_d}{N} \quad (1)$$

For example, if there are 3 base stations in the soft handoff, the predefined percentage is 50%, the number of times that the relevant base stations' transmit power levels are not equal to the minimum-threshold power level is 20, and the largest possible down step size per frame is 0.5, then using equation 1, the threshold step size equals $$\frac{20 - 16 * 3 * (1 - .5)}{1 - .5} * \frac{.5}{16} = 2 * (20 - 24) * .03125 = -.25 \text{ dB}.$$

After determining the threshold step size, then, in step 580, processor 328 increases the minimum-threshold power level by the smaller of either the threshold step size or a value that would make the minimum-threshold power level equal to its allowed highest power level. Processor 328 proceeds to step 595 and transmits the adjusted threshold power level to the base stations. Processor 328 then returns to step 565 to await the next transmit power levels. If the answer in step 577 is yes, the processor does not adjust the minimum-threshold power level and returns to step 565 to await the next transmit power levels.

When the answer in step 575 is yes, in step 585, processor 328 checks if the minimum-threshold power level is equal to the lowest power level that the minimum-threshold power level is allowed to equal. This lowest power level is the power level needed for a call when the base station is at full load and the path loss between the base station and the mobile terminal is at its lowest. The lowest power level can be obtained either from simulation or an empirical study. Typically, the lowest power level can be between 8 dB and 20 dB below the pilot's power level. For example, in a CDMA 2000 1X system having a data rate of 9600 and a chip rate of 1.2288 M chips/sec, the highest power level can be 20 dB below the pilot's power level.

If the answer in step 585 is no, in step 587, processor 328 determines the threshold step size using equation 1 as described above. For example, if there are 3 base stations in the soft handoff, the predefined percentage is 50%, the number of times that the relevant base stations' transmit power levels are not equal to the minimum-threshold power level is 30, and the largest possible down step size per frame is 0.5, then using equation 1, the threshold step size equals $$\frac{30 - 16 * 3 * (1 - .5)}{1 - .5} * \frac{.5}{16} = 2 * (30 - 24) * .03125 = .375 \text{ dB}.$$

After determining the threshold step size, then, in step 590, processor 328 decreases the minimum-threshold power level by the smaller of either the threshold step size or a value that would make the minimum-threshold power equal to its allowed lowest power level. Processor 328 proceeds to step 595 and transmits the adjusted threshold power level to the base stations. Processor 328 then returns to step 565 to await the next transmit power levels. If the answer in step 585 is yes, the processor does not adjust the minimum-threshold power level and returns to step 565 to await the next transmit power levels.

Optionally, when the minimum-threshold power level is equal to either the highest or the lowest power level that it is allowed to be in steps 577 and 585, respectively, the processor can go to step 595 to transmit the minimum-threshold power level although. Processor 328 then returns to step 565 to await the next transmit power levels.

Figure 6:
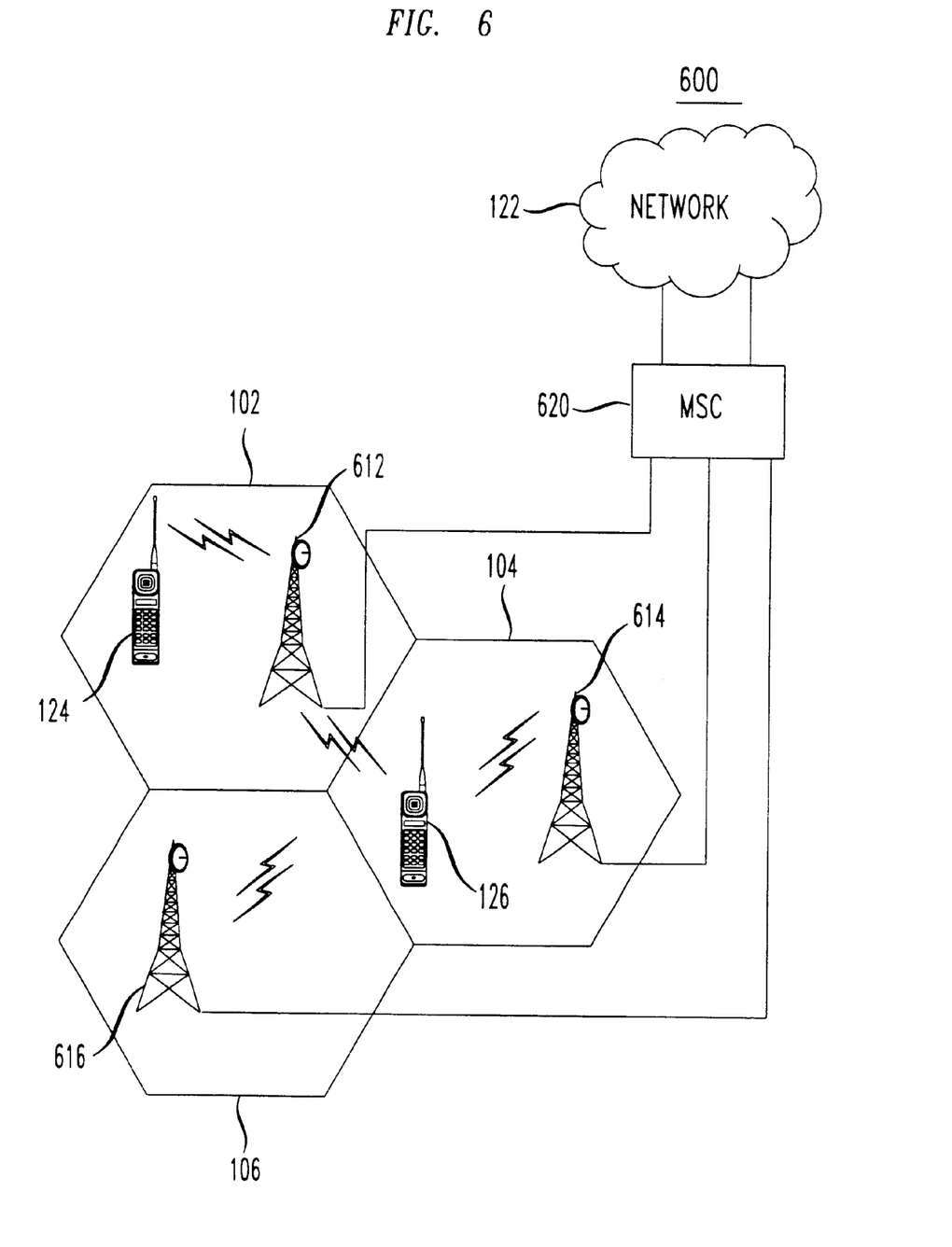
FIG. 6 is a block diagram of a portion of a wireless communication system in which the base stations have a threshold power level.
Figure 7A:
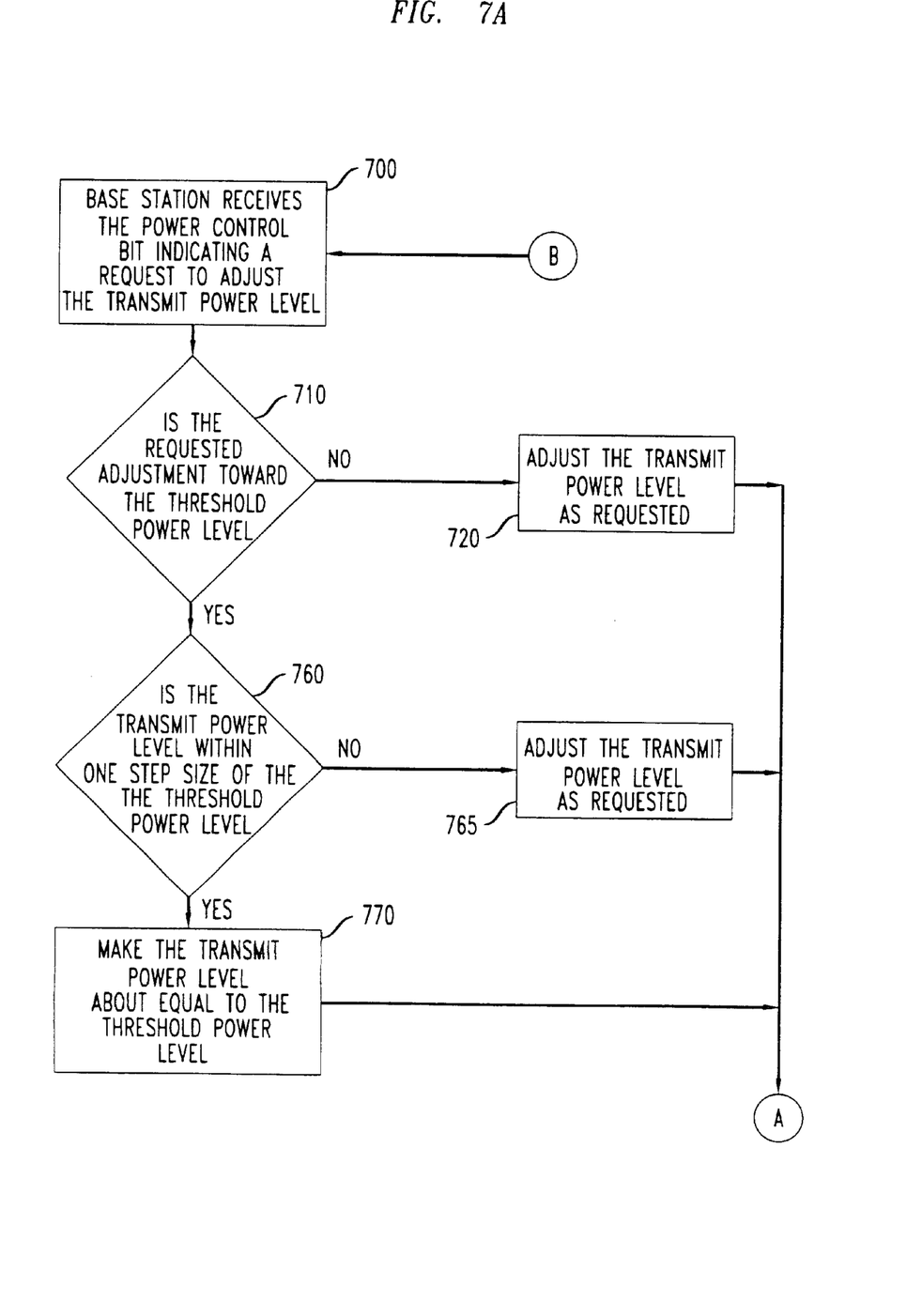
FIGS. 7A and 7B are flowcharts illustrating the method of controlling the transmit power level of a base station when the base station has a threshold power level.
Figure 7B:
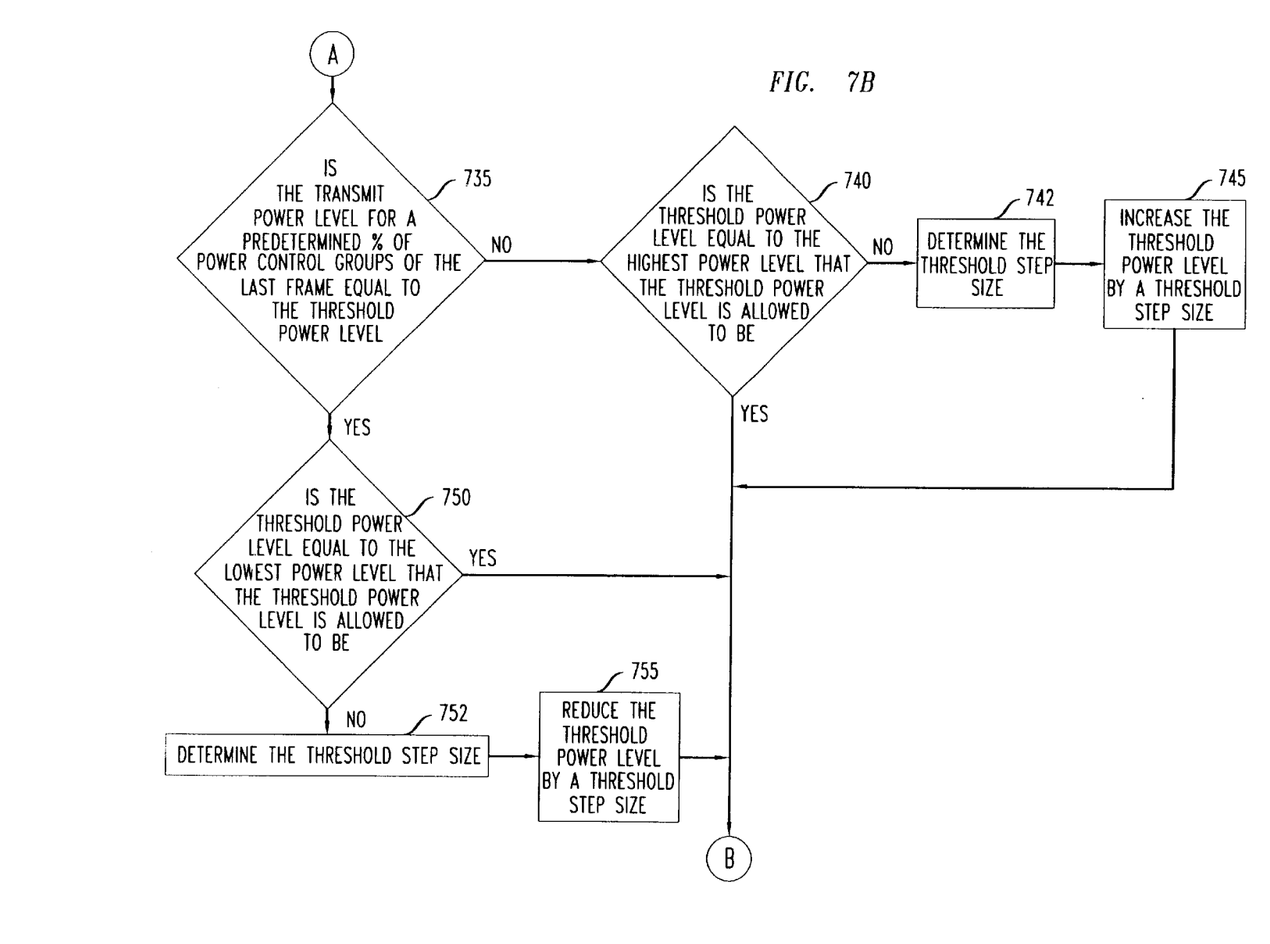
Figure 8:
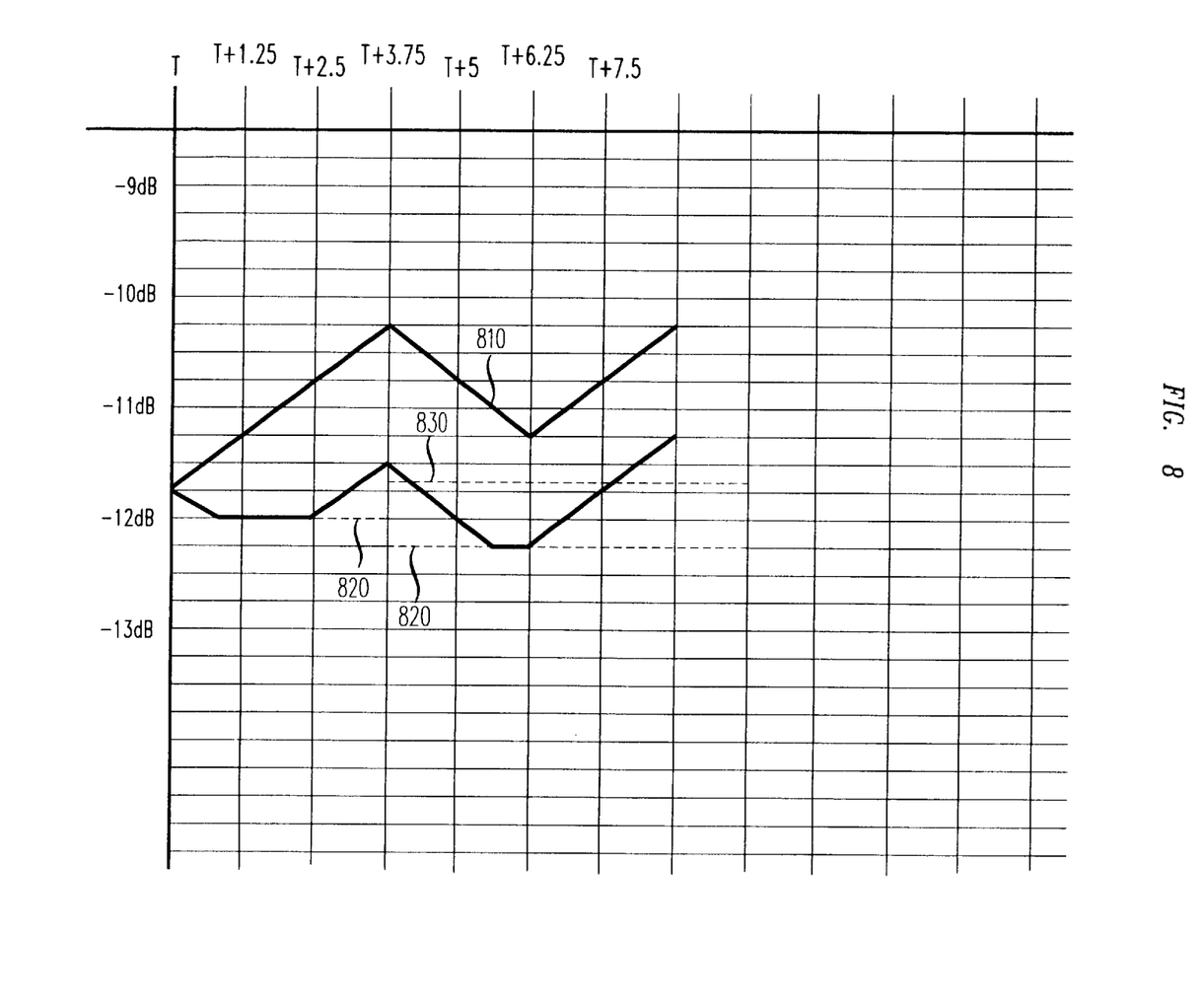
FIG. 8 is a graph illustrating the power level of a forward link traffic channel of the base stations in FIG. 6 over time.

FIGS. 6, 7, and 8 illustrate the case where each base station adjusts the threshold power level locally without input from other base stations, and then adjusts its transmit power level. Mobile terminal 126 transmits a power control bit (PCB) requesting an adjustment of the transmit power level of forward link. For example, mobile terminal 126 transmits a power control bit requesting that the base stations increase the transmit power level. In step 700, each of the base stations 612, 614, and 616 receives the power control bit. Base station 612 and 616 receive a power control bit requesting that the base stations increase their transmit power level. However, due to fading and/or interference on the reverse traffic link between mobile terminal 126 and base station 614, base station. 614 receives a power control bit requesting that to decrease its transmit power level (i.e., it receives an incorrect power control bit). In step 710, each of the base stations 612, 614, and 616 checks if the received power control bit instructed it to adjust its transmit power level toward the minimum-threshold power level. In this case, each base station checks if the power control bit instructed the base station to adjust its transmit power level down. For base stations 612 and 616 the answer in step 710 is no. As shown in FIG. 8, at time T, these two base stations proceed to step 720 where they adjust their transmit power level 810 up by one step size, as indicated by the power control bit. Base stations 612 and 616 then proceed to step 735, where each of the base stations checks whether a predetermined percentage of the power control groups, received during the last frame, had transmit power levels equal to the minimum-threshold power level. For example, when the predetermined percentage is 50%, since each base station receives 16 power control groups per frame and 50% of 16 power control groups is 8, then, in step 735, each of the base stations checks if for at least 8 power control groups the transmit power levels were equal to the minimum-threshold power level. When the answer in step 735 is no, in step 740 each of the base stations 612 and 616 checks if the minimum-threshold power level is equal to the highest power level allowable for the minimum-threshold power level.

If the answer in step 740 is no, in step 742, each of the base stations calculates the threshold size using equation 1. However, since the base station only has information related to itself, $A_N$, which is the number of base stations involved in the soft handoff, is set to 1 regardless of the number of base stations actually involved in the soft handoff. Then, in step 745 base stations 612 and 616 increase the minimum-threshold power level by the smaller of either the threshold step size or a value that would make the minimum-threshold power equal to the highest power level it is allowed to be. Base stations 612 and 616 then return to step 700 to await the next power control bit. If the answer in step 740 is yes, the base stations do not adjust the minimum-threshold power level and just return to step 700 to await the next power control bit.

Returning to step 735, when the answer in step 735 is yes, then, in step 750, each base station checks if the minimum-threshold power level is equal to the lowest power level allowable for the minimum-threshold power level. If the answer in step 750 is no, in step 752, each of the base stations calculates the threshold size using equation 1. However, since the base station only has information related to itself, $A_N$ is set to 1 regardless of the number of base stations actually involved in the soft handoff. Then, in step 755, each base station decreases the minimum-threshold power level by the smaller of either the threshold step size or a value that would make the minimum-threshold power equal to the lowest power level it is allowed to be. Base stations 612 and 616 then return to step 700 to await the next power control bit. If the answer in step 750 is yes, the base stations do not adjust the minimum-threshold power level and just return to step 700 to await the next power control bit.

Returning to step 710, for base station 614 the answer in step 710 is yes, and it proceeds to step 760 where base station 614 checks if its transmit power level 830 is within one step size from the minimum-threshold power level 820. If the answer in step 760 is no, in step 765, the base station would adjust its transmit power level down by one step size, and proceed to step 735 from which it proceeds to adjust its minimum-threshold power level as described above. If the answer in step 760 is yes, as it is in this case, base station 614 proceeds to step 770 and adjusts its transmit power level 830 to be equal to the minimum-threshold power level 820. Base station 614 then proceeds to step 735 from which it proceeds to adjust its minimum-threshold power level as described above.

Because base station 614 had the strongest forward link and reduced the transmit power level 830 of the forward link, mobile terminal 126 is still not getting the signal at a desired power. Mobile terminal 126 sends another power control bit requesting that the base stations increase the power on the forward link. At step 700, base stations 612 and 616 receive a power control bit requesting that the base stations increase their power. Then, following the steps described above, at time T+1.25, base stations 612, and 616 again increase the power level of their forward link by an up step. If the reverse traffic link has not improved, base station 614 can again receive a power control bit requesting that it decrease its power level. Base station 614 follows the same steps described above. As can be seen in FIG. 8, when base station 614 reaches step 760 at time T+1.25, its transmit power level 830 is already at the minimum-threshold power level 820. Therefore, base station's 614 transmit power level 830 remains at the minimum-threshold power level 820.

Mobile terminal 126 again sends a power control bit requesting an increase in the power on the forward link. When base station 614 finally receives the correct power control bit, it increases the transmit power level 830 on its forward link, and mobile terminal 126 finally receives the signal at an acceptable power level. Base stations 612 and 616 also receive the power control bit, and also increase the transmit power level 810 on their forward links.

As can be seen in FIG. 8, because each base station adjusts its own minimum-threshold power level, the minimum-threshold power level can vary from one base station to another. However, the transmit power levels are not as widely separated since the base stations adjust the minimum-threshold power levels by a threshold step size, and the transmit power level cannot be less then the minimum power level. Therefore, during soft handoff the difference between the transmit power levels 810 and 830 of the base stations having the minimum-threshold power level is significantly smaller than the difference between the transmit power levels of the base stations not having minimum-threshold power level. This prevents some of the base stations from transmitting at an excessive power level and, therefore, reduces the total power of the system.

Referring to FIGS. 6 and 5A the case is now described where the threshold power level is fixed, each base station is programmed with the fixed threshold power level, and each base station decides on how to adjust its transmit power level locally. In this case, the base stations follow a portion of the method described above for the case for a minimum-threshold power level adjusted by the processor. The applicable portion includes the steps performed by the base station that do not include the processor, i.e., steps 500 through 550.

In step 500, the base stations receive the power control bit. In step 510, each of the base stations 612, 614, and 616 checks if the received power control bit instructed it to adjust its transmit power level toward the minimum-threshold power level. In this case, each base station checks if the power control bit instructed the base station to lower its transmit power level. If for a particular base station the answer in step 510 is no, the base station proceeds to step 520, where it adjusts its transmit power level up by one step size. The base station then returns to step 500 and awaits the next power control bit. If the answer in step 510 is yes, the base station proceeds to step 530, where the base station checks if its transmit power level is within one step size from the minimum-threshold power level. If the answer in step 530 is no, in step 540, the base station adjusts its transmit power level down by one step size, and return to step 500 to await the next power control bit. If the answer in step 530 is yes, the base station proceeds to step 550 and adjusts its transmit power level to be equal to the minimum-threshold power level. The base station then returns to step 500 and awaits the next power control bits.

Similarly to the methods described above, the fixed minimum-threshold power level keeps the differences between the transmit power levels of the base stations in a soft handoff smaller than the differences between the transmit power levels of the base stations not having the fixed minimum-threshold power level. This prevents some of the base stations from transmitting at an excessive power level and, therefore, reduces the total power of the system.

The fixed minimum-threshold power level should be selected to be the minimum-threshold power level that reduces the total transmitted power by the greatest amount. Typically, this value will be between about 8 dB and 10 dB below the power level of the pilot.

The fixed minimum-threshold power level can be obtained by performing the simulations or an empirical study described above for the case having a minimum-threshold power level adjusted by the processor. The averaged minimum-threshold power level associated with the optimum percentage should be the fixed minimum-threshold power level of the base stations.

Each base station in a soft handoff should use the same value for the fixed threshold power level when communicating with the mobile station in the soft handoff. This fixed threshold power level can be determined by the primary base station and provided to the secondary base stations at the start of the soft handoff, or the fixed threshold power level can be determined at a central location, such as MSC 620, and provided to all of the base stations in the soft handoff. The base stations in another soft handoff can use either this same value or another value for the fixed threshold power level when communicating with the mobile station in the other soft handoff.

Although, the above illustrative embodiments have been described for the minimum-threshold power levels, all of these embodiments can include either a maximum power level, or both a minimum and maximum-threshold power level. Similarly to the minimum-threshold power levels, the maximum-threshold power-levels are selected to obtain the lowest total power. The maximum-threshold power levels can be selected in a manner similar to the minimum-threshold power level. However, care should be taken to ensure that adding a maximum-threshold power level does not lead to an unacceptable number of errors in the transmitted signal. For example, the cases where the maximum-threshold power levels are adjustable, the maximum-threshold power levels should be adjusted when the percentage of power control groups having a power level equal to the maximum-threshold power level is about 1% to 5% of the power control groups from all the base station in the soft handoff during the frame.

The foregoing is merely illustrative. Thus, for example, although in the illustrative embodiment the time period is one frame and the time interval is one power control group, any time period having at least one time interval can be used, and any time interval can be used during which a power level measurement of the forward link can be taken. For example, the time period can be several frames, or one or several power control groups, which are 1.25 ms time intervals for which power measurements of the forward link can be taken. The time interval can be several power control groups, or one or several frames.

Furthermore, although in the illustrative embodiment the processor is located in a central location, such as the MSC, the processor can be located at one of the base stations. Alternatively, the processing function can be distributed among the MSC and several base stations, or distributed just among several base stations.

While the invention has been described with reference to a preferred embodiment, it will be understood by those skilled in the art having reference to the specification and drawings that various modifications and alternatives are possible therein without departing from the spirit and scope of the invention.

We claim:

1. A method for controlling a transmit power level for ones of a plurality of a base stations in communication with a given mobile unit in a wireless system, the method comprising the steps of:

maintaining a transmit power level of each of the plurality of base stations at or above a minimum-threshold power level;

receiving at each of the plurality of base stations power control information for a plurality of power control groups; and adjusting the threshold power level by a threshold step size in response to the transmit power levels of the plurality of base stations being substantially equal to the threshold power level for at least a predetermined percentage of the plurality of power control groups received at the plurality of base stations.

2. The method of claim 1, wherein:

the threshold power level is a minimum-threshold power level;

the predetermined percentage is at least 50%; and the step of adjusting the threshold power level comprises adjusting the minimum-threshold power level down by a threshold step size.

3. A method of claims 1, further comprising the step of:

adjusting the transmit power level of the base station to be at the threshold power level responsive to the power control information indicating to adjust the transmit power level toward the threshold power level and responsive to the transmit power level of the base station being within one step size of the threshold power level.

4. The method of claim 1, wherein:

the threshold power level is a maximum-threshold power level;

the predetermined percentage is between about 1% and about 5%; and the step of adjusting the threshold power level comprises adjusting the maximum-threshold power level up by a threshold step size.

5. The method of claim 1, wherein the threshold step size is a factor of the number of time intervals for which the transmit power level is equal to the threshold power level.

6. The method of claim 1, wherein the time interval comprises one power control group.

7. The method of claim 1, wherein the time period comprises one or more time intervals.

8. The method of claim 1, wherein the time period comprises one frame.

9. The method of claim 1, wherein:

the step of receiving power control information comprises each of a plurality of base stations receiving power control information for each time interval;

the step of adjusting the transmit power level of the base station comprises each base station adjusting the transmit power level of that base station to be at a threshold power level responsive to the power control information received at that base station indicating to adjust the transmit power level toward the threshold power level and responsive to the transmit power level of that base station being within one step size of the threshold power level; and the step of adjusting the threshold power level comprising each base station adjusting its threshold power level by a threshold step size responsive to the transmit power level received at that base station being equal to the threshold power level for at least a predetermined percentage of a time period.

10. The method of claim 1, wherein the step size is 0.5 dB.

11. A method of claim 1, wherein:

the threshold power level is a minimum-threshold power level;

the predetermined percentage is between about 10% and about 70%; and the step of adjusting the threshold power level comprises adjusting the minimum-threshold power level down by a threshold step size.

12. The method of claim 11, further comprising the step of adjusting a maximum-threshold power level up by a threshold step size responsive to the transmit power level being equal to a maximum-threshold power level for at least between about 1% and about 5% of the time intervals.

13. The method of claim 1, wherein:

the step of receiving power control information comprises each of a plurality of base stations receiving power control information for each time interval, wherein each of the plurality of base stations are participating in the same soft handoff; and the step adjusting the threshold power level of the base station comprises:

forwarding the power control information received on each of the plurality of base stations to a processor;

adjusting the threshold power level by a threshold step size responsive to the transmit power levels from all of the base stations being substantially equal to the threshold power level for at least a predetermined percentage of the time intervals; and forwarding the adjusted threshold power level to each base station.

14. The method of claim 13, wherein the processor is located at a mobile switching center of the wireless communication system.

15. The method of claim 13, wherein the processor is distributed between at least two of the plurality of base stations.

16. The method of claim 13, wherein the processor is distributed between at least one of the plurality of base stations and a mobile switching center of the wireless communication system.

* * * * *